(12) United States Patent
Dahl et al.

(10) Patent No.: US 12,319,518 B2
(45) Date of Patent: Jun. 3, 2025

(54) PNEUMATIC TUBE SYSTEM WITH SECURE CARRIER STORAGE

(71) Applicant: Pevco Systems International Inc., Baltimore, MD (US)

(72) Inventors: Steven M. Dahl, Baltimore, MD (US); Matthew Brown, Nottingham, MD (US); Joseph Gaultney, Lutherville Timonium, MD (US); Adrian Tenney, Essex, MD (US); Mark T. MaClean-Blevins, Westminster, MD (US)

(73) Assignee: PEVCO SYSTEMS INTERNATIONAL INC., Baltimore, MD (US)

( * ) Notice: Subject to any disclaimer, the term of this patent is extended or adjusted under 35 U.S.C. 154(b) by 815 days.

(21) Appl. No.: 17/647,784

(22) Filed: Jan. 12, 2022

(65) Prior Publication Data
US 2022/0227589 A1 Jul. 21, 2022

Related U.S. Application Data

(60) Provisional application No. 63/199,709, filed on Jan. 19, 2021.

(51) Int. Cl.
*B65G 51/32* (2006.01)
(52) U.S. Cl.
CPC ...... *B65G 51/32* (2013.01); *B65G 2812/1691* (2013.01)

(58) Field of Classification Search
None
See application file for complete search history.

(56) References Cited

U.S. PATENT DOCUMENTS

| | | | | |
|---|---|---|---|---|
| 3,337,159 | A * | 8/1967 | Hoehmann | B65G 47/5104 406/182 |
| 3,711,038 | A * | 1/1973 | Van Otteren | B65G 51/04 406/84 |
| 4,442,865 | A * | 4/1984 | Shigeo | F16K 11/00 406/182 |
| 5,864,485 | A * | 1/1999 | Hawthorne | B65G 51/36 700/229 |
| 6,659,693 | B1 * | 12/2003 | Perkins | B65G 51/24 406/13 |

(Continued)

*Primary Examiner* — Joseph A Dillon, Jr.
(74) *Attorney, Agent, or Firm* — Fay Kaplun & Marcin, LLP

(57) ABSTRACT

A carrier vault for a workstation of a pneumatic tube system includes a rotatable carousel comprising at least a first and second carrier port, each carrier port sized and shaped to hold a carrier used to transport materials via the pneumatic tube system and to allow the carrier to pass through the carousel. The carousel is configured to rotate between a first position, where the first carrier port is aligned with an access tube of the pneumatic tube system and a second position, where the second carrier port is aligned with the access tube. The carrier vault further comprises a selection gate adjacent to the carousel comprising a rotatable plate and a selection gate opening. The selection gate is configured to rotate between an open position, where the carrier is allowed to pass through the plate, and a closed position, where the carrier is prevented from passing through the plate.

13 Claims, 11 Drawing Sheets

(56) References Cited

U.S. PATENT DOCUMENTS

| | | | |
|---|---|---|---|
| 6,702,150 B2* | 3/2004 | Sumetzberger | B65G 51/32 |
| | | | 221/265 |
| 6,712,561 B1* | 3/2004 | Valerino, Sr. | A61B 50/362 |
| | | | 406/197 |
| 7,013,198 B2* | 3/2006 | Haas | G01N 35/028 |
| | | | 414/223.01 |
| 7,424,340 B2* | 9/2008 | Owens | B65G 51/46 |
| | | | 406/182 |
| 8,641,329 B2* | 2/2014 | Barrios | B65G 51/24 |
| | | | 406/182 |
| 9,611,105 B1* | 4/2017 | Powder | B65G 51/46 |
| 10,227,184 B2* | 3/2019 | Gross | B65G 51/46 |
| 10,252,869 B2* | 4/2019 | Nguyen | B65G 51/04 |
| 10,287,109 B2* | 5/2019 | Sørensen | B65G 51/02 |
| 10,373,710 B2* | 8/2019 | Valerino | G06Q 10/0833 |
| 11,279,571 B1* | 3/2022 | Faletti | B65G 51/06 |
| 2002/0140223 A1* | 10/2002 | Sumetzberger | B65G 51/32 |
| | | | 285/119 |
| 2014/0330428 A1* | 11/2014 | Wolfe | B65G 51/44 |
| | | | 700/226 |
| 2015/0298919 A1* | 10/2015 | Le | B65G 51/24 |
| | | | 406/181 |
| 2021/0380342 A1* | 12/2021 | Wright | G07F 9/105 |
| 2024/0319219 A1* | 9/2024 | Malin | G01N 35/04 |

* cited by examiner

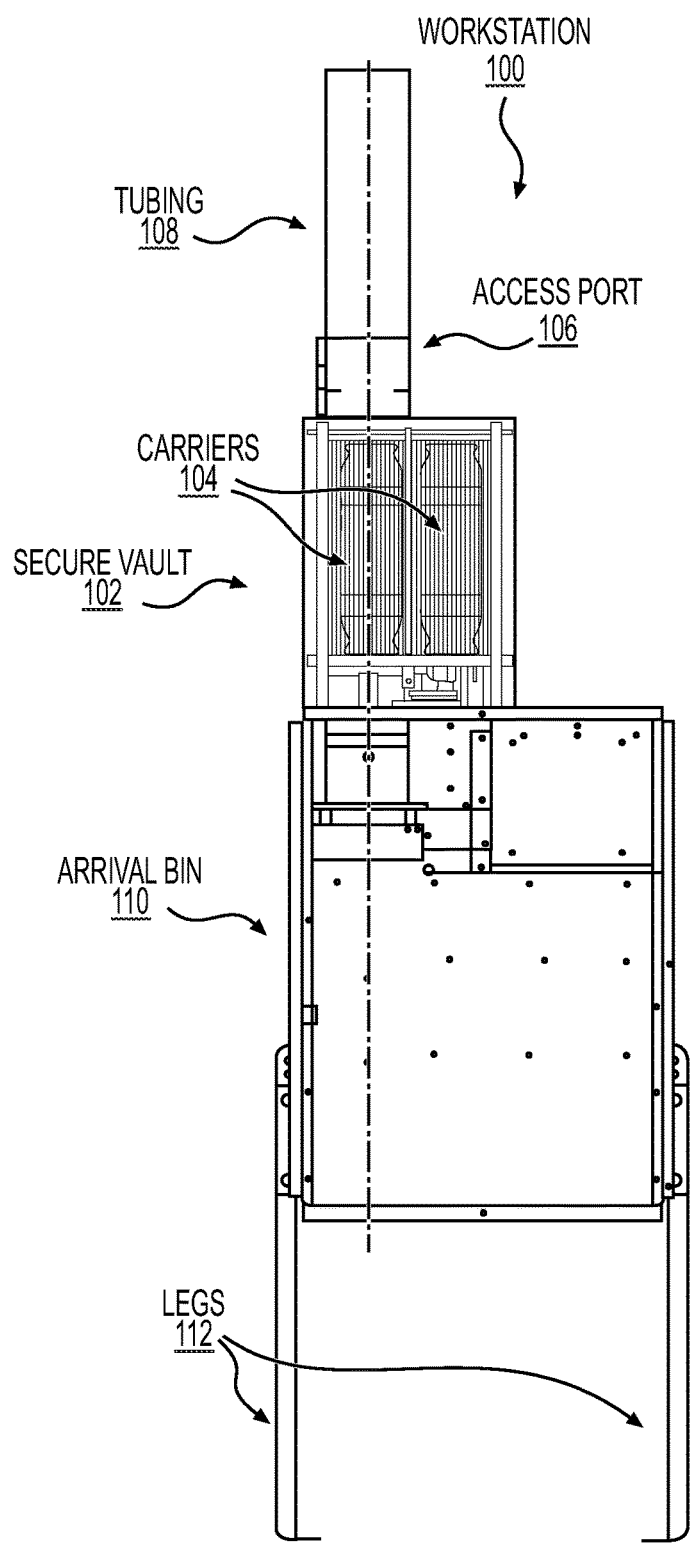
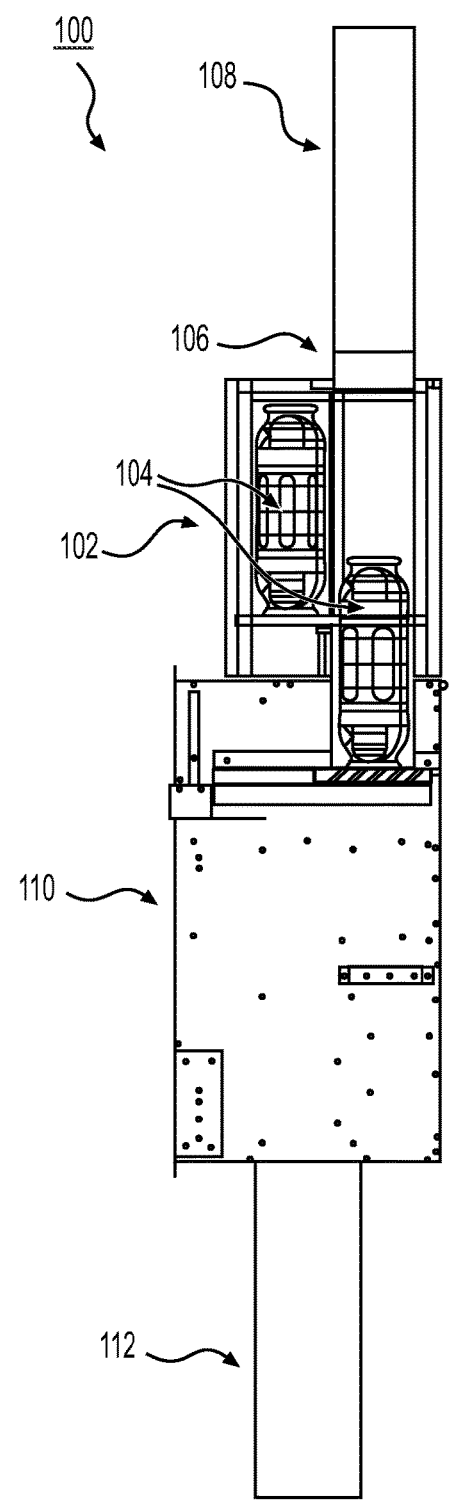
FIG. 1A　　　　FIG. 1B

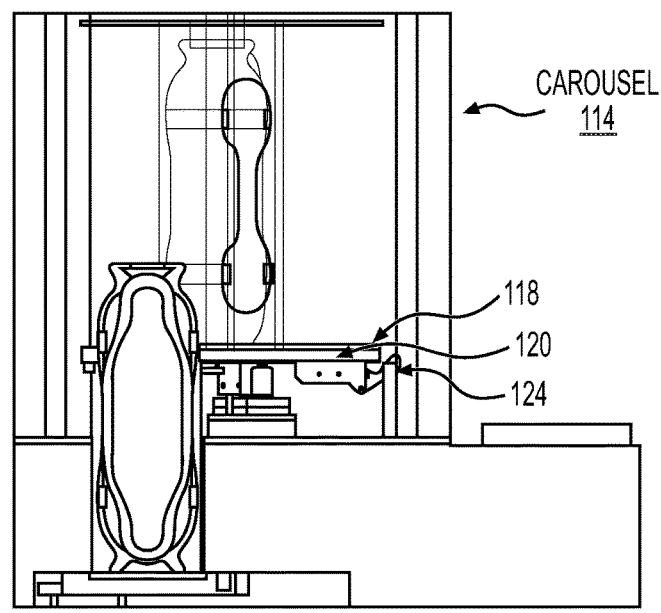
FIG. 3A
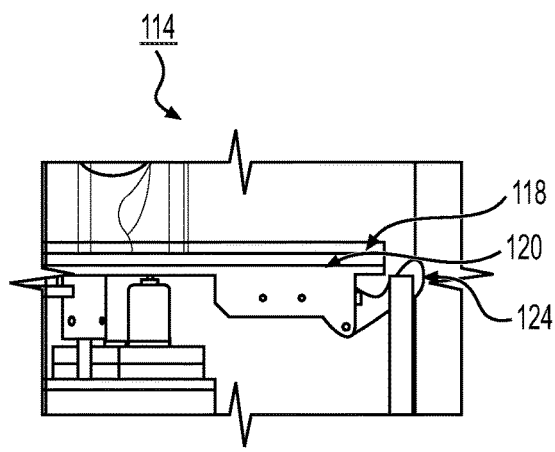 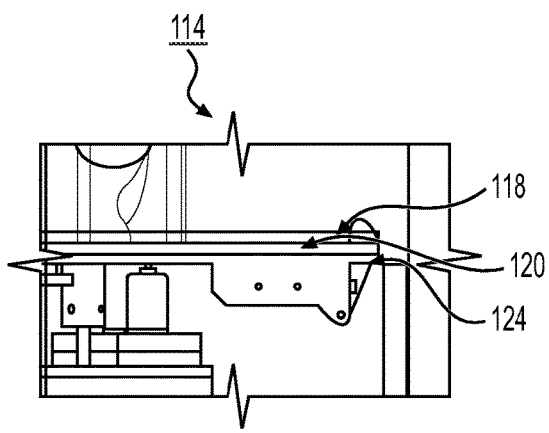
FIG. 3B　　　FIG. 3C

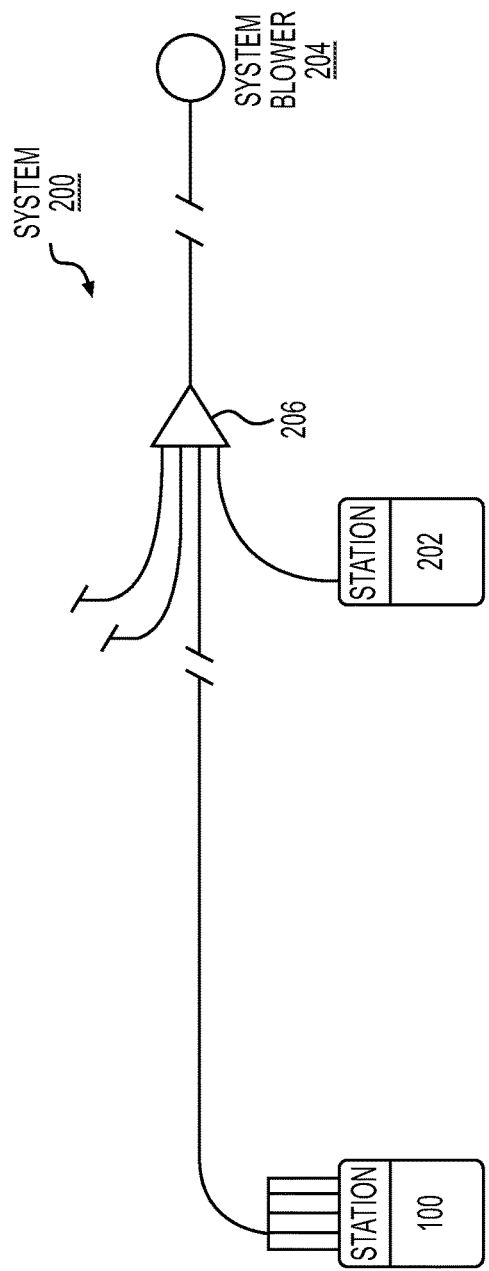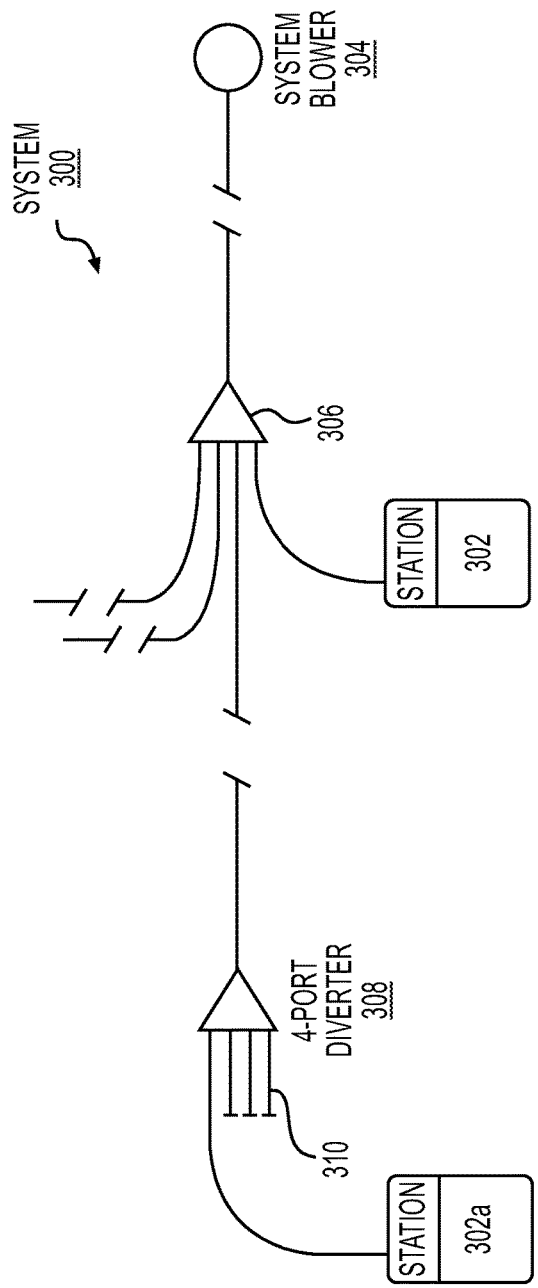

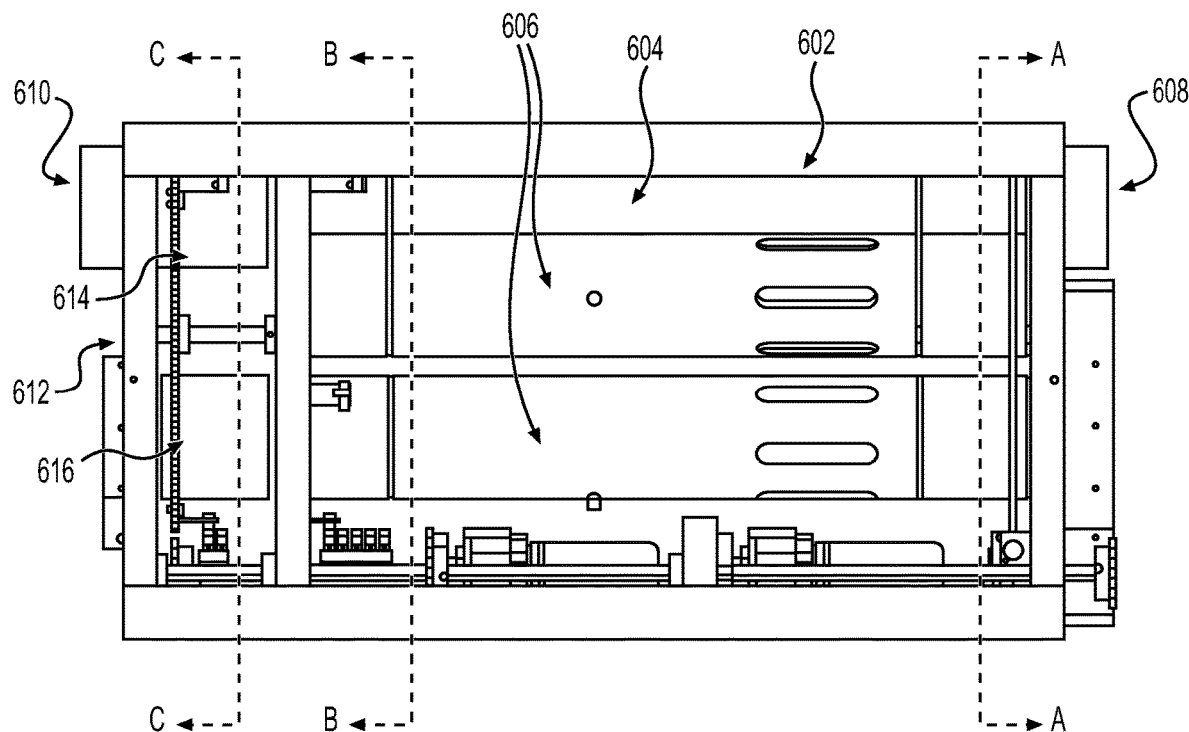
FIG. 9C
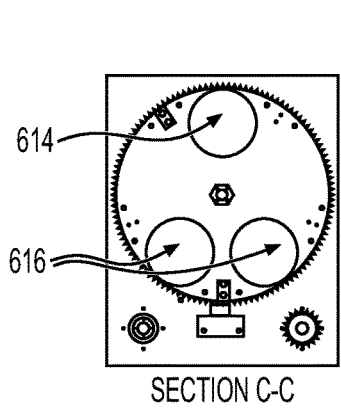 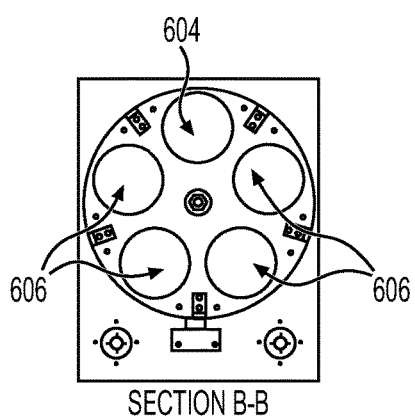 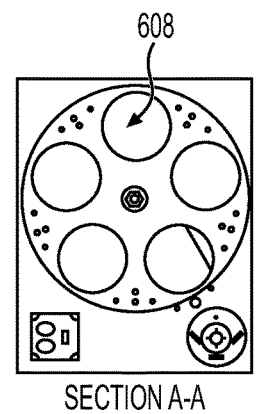
FIG. 9D  FIG. 9E  FIG. 9F

PNEUMATIC TUBE SYSTEM WITH SECURE CARRIER STORAGE

PRIORITY CLAIM

The present disclosure claims priority to U.S. Provisional Patent Application Ser. No. 63/199,709 filed Jan. 19, 2021; the disclosure of which is incorporated herewith by reference.

BACKGROUND

Pneumatic tube systems transport various items through buildings or groups of buildings such as, for example, moving drugs, lab specimens and blood products to various locations throughout a hospital. All items delivered by a hospital pneumatic tube system must be handled with care and safeguarded given their role in patient care. However, certain deliveries either require or benefit from additional security, tracking and control. Existing pneumatic tube systems used to safeguard high-value items, or for otherwise holding inbound and outbound carriers when other resources are busy, can decrease efficiency and increase complexity of the system.

SUMMARY

The present disclosure relates to a carrier vault for a workstation of a pneumatic tube system. The carrier vault comprises a rotatable carousel comprising at least a first and second carrier port, each carrier port sized and shaped to hold a carrier used to transport materials via the pneumatic tube system and to allow the carrier to pass through the carousel, the carousel being configured to rotate between a first position, where the first carrier port is aligned with an access tube of the pneumatic tube system, and a second position, where the second carrier port is aligned with the access tube. The carrier vault further comprises a selection gate adjacent to the carousel comprising a rotatable plate and a selection gate opening, the selection gate being configured to rotate between an open position, where the selection gate opening is aligned with the access tube and the carrier is allowed to pass through the plate, and a closed position, where the selection gate opening is not aligned with the access tube and the carrier is prevented from passing through the plate. When an arriving carrier is to be stored in the carrier vault, the carousel is rotated to or maintained in the first position and the selection gate is rotated into or maintained in the closed position to receive the arriving carrier in the first carrier port. When the arriving carrier is received in the first carrier port, the carousel is rotated to the second position and the selection gate is rotated into the open position so that the arriving carrier is stored in the carrier vault and the workstation remains available for subsequent carrier transmissions through the second carrier port.

The present disclosure also relates to a pneumatic tube system comprising a workstation configured to send and receive carriers via the pneumatic tube system, a carrier vault for the workstation located separately from the workstation in the pneumatic tube system, the carrier vault comprising at least one carrier port for holding carriers and a port for servicing the workstation, and a system blower configured to place an arriving carrier for the workstation into the carrier port.

The present disclosure also relates to a storage device of a pneumatic tube system. The storage device comprises a rotatable carousel comprising at least a first tube and a second tube, each tube sized and shaped to permit passage of a carrier used to transport materials via the pneumatic tube system, the carousel being configured to rotate between a first position, where the first tube is aligned with an access tube of the pneumatic tube system, and a second position, where the second tube is aligned with the access tube. The storage device further comprises a stop plate adjacent to the carousel comprising an open tube stub and at least one closed tube stub, the stop plate being configured to rotate between an open position, where the open tube stub is aligned with the access tube and the carrier is allowed to pass through the stop plate, and a closed position, where the closed tube stub is aligned with the access tube and the carrier is prevented from passing through the stop plate. When an arriving carrier is to be stored in the storage device, the carousel is rotated to or maintained in the second position and the stop plate is rotated into or maintained in the closed position to receive the arriving carrier in the second tube. When the arriving carrier is received in the second tube, the carousel is rotated to the first position and the stop plate is rotated into the open position so that the arriving carrier is stored in the storage device and the workstation remains available for subsequent carrier transmissions through the first tube.

BRIEF DESCRIPTION

FIGS. 1a-b show an exemplary pneumatic tube workstation for a pneumatic tube system including a secure vault for securely holding multiple carriers prior to retrieval by authorized personnel, according to various exemplary embodiments described herein.

FIGS. 2a-b show perspective views of the secure vault of FIGS. 1a-b.

FIGS. 3a-c shows the exemplary carousel of the previous Figures including a latch for attaching the selection gate to the platform of the carousel.

Figure 4A:
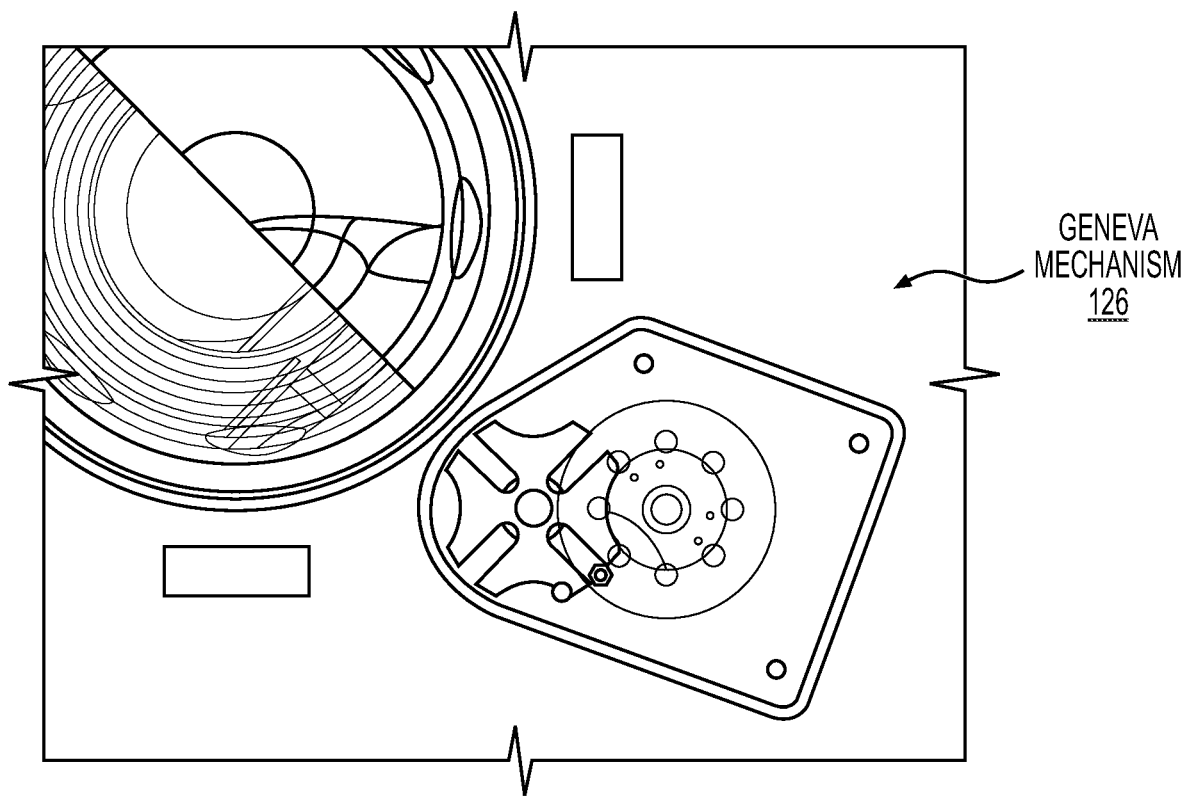
Figure 4B:
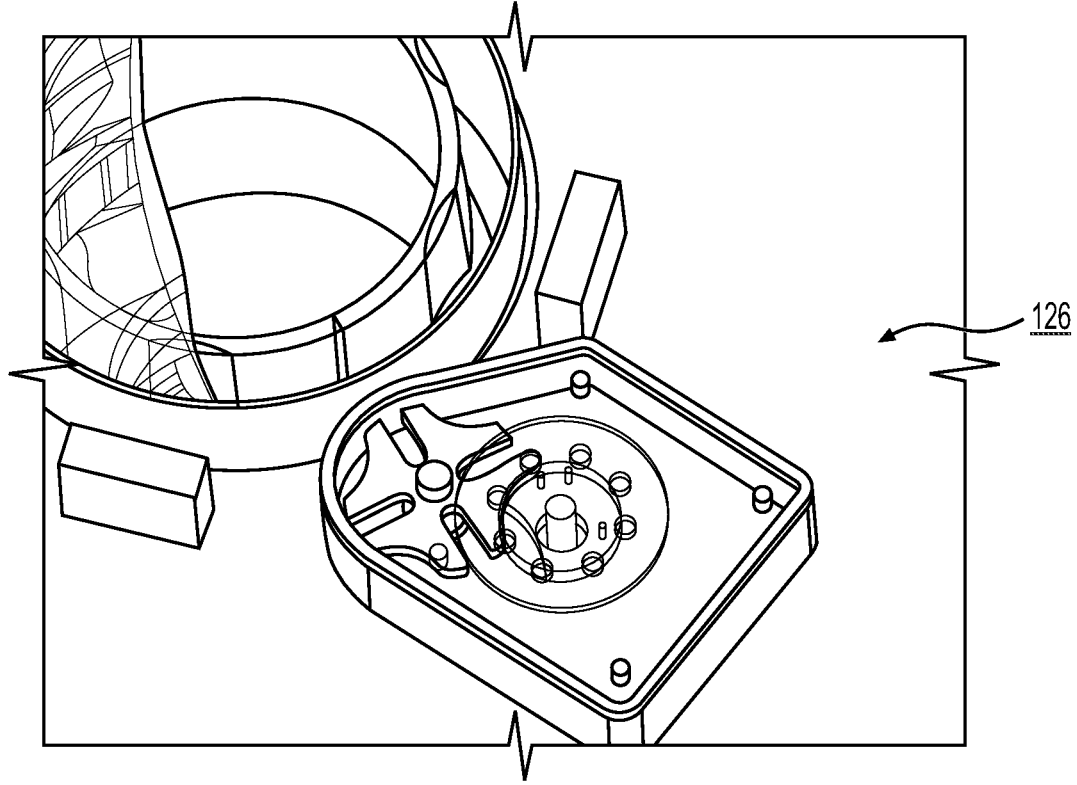

FIGS. 4a-b show a Geneva mechanism for rotating the carousel.

FIG. 5 shows a pneumatic tube system for the workstation comprising the secure carrier vault of the previous Figures.

FIG. 6 shows a pneumatic tube system 300 comprising a diverter with storage stubs for use as a secure carrier vault.

Figure 7:
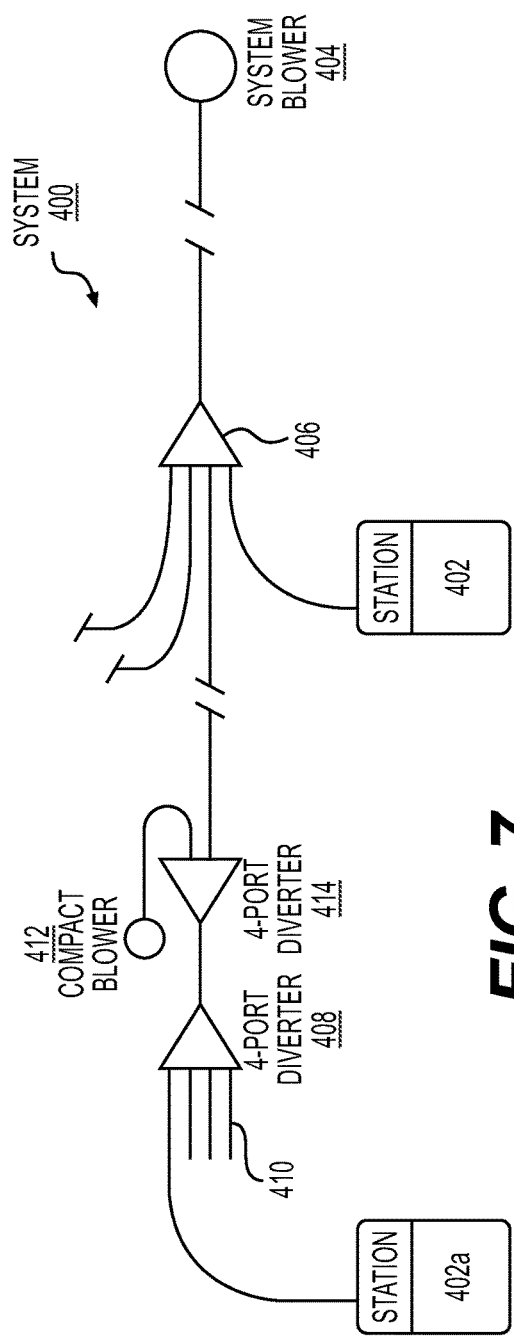

FIG. 7 shows a pneumatic tube system comprising a dedicated compact blower and a diverter with storage stubs for use as a secure carrier vault.

Figure 8:
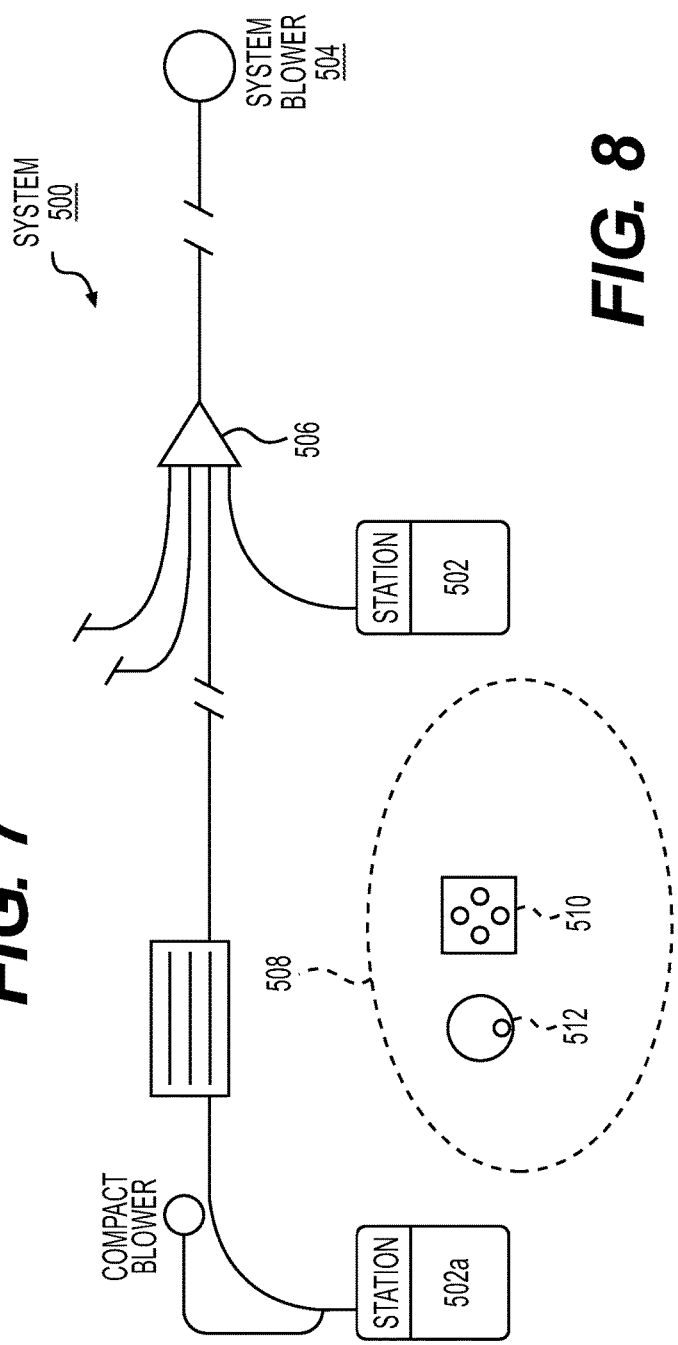

FIG. 8 shows a pneumatic tube system comprising a horizontal storage device for use as a secure carrier vault.

Figure 9A:
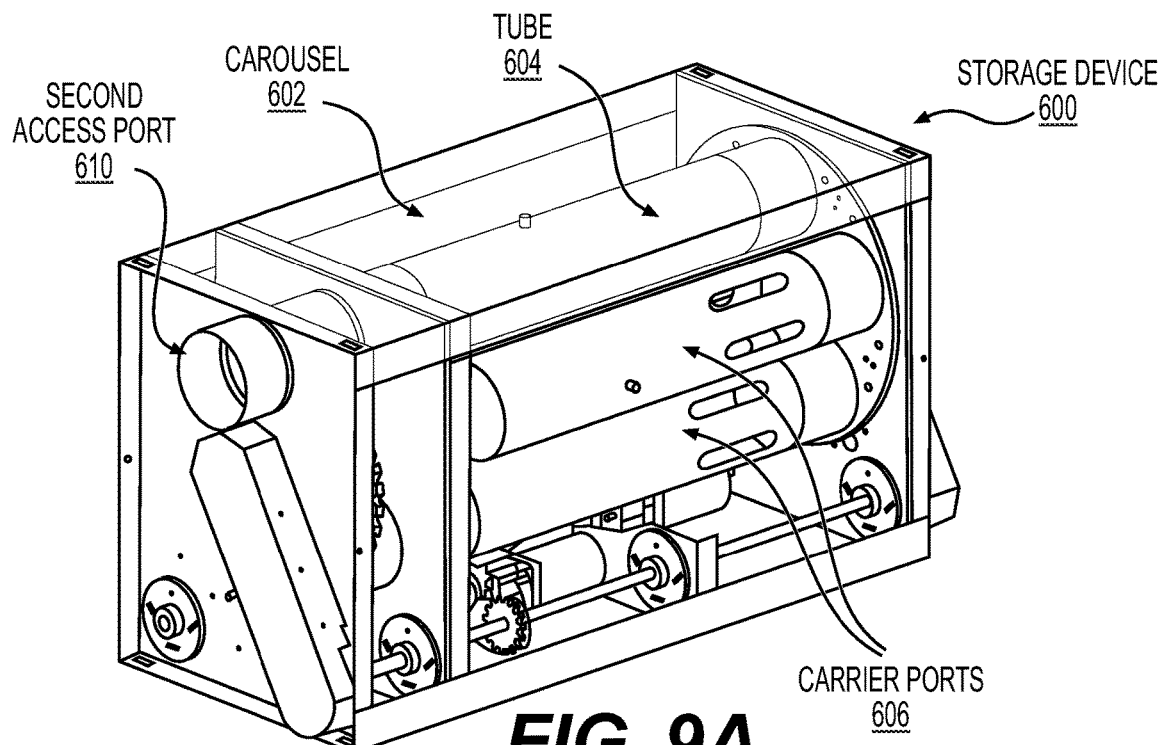
Figure 9B:
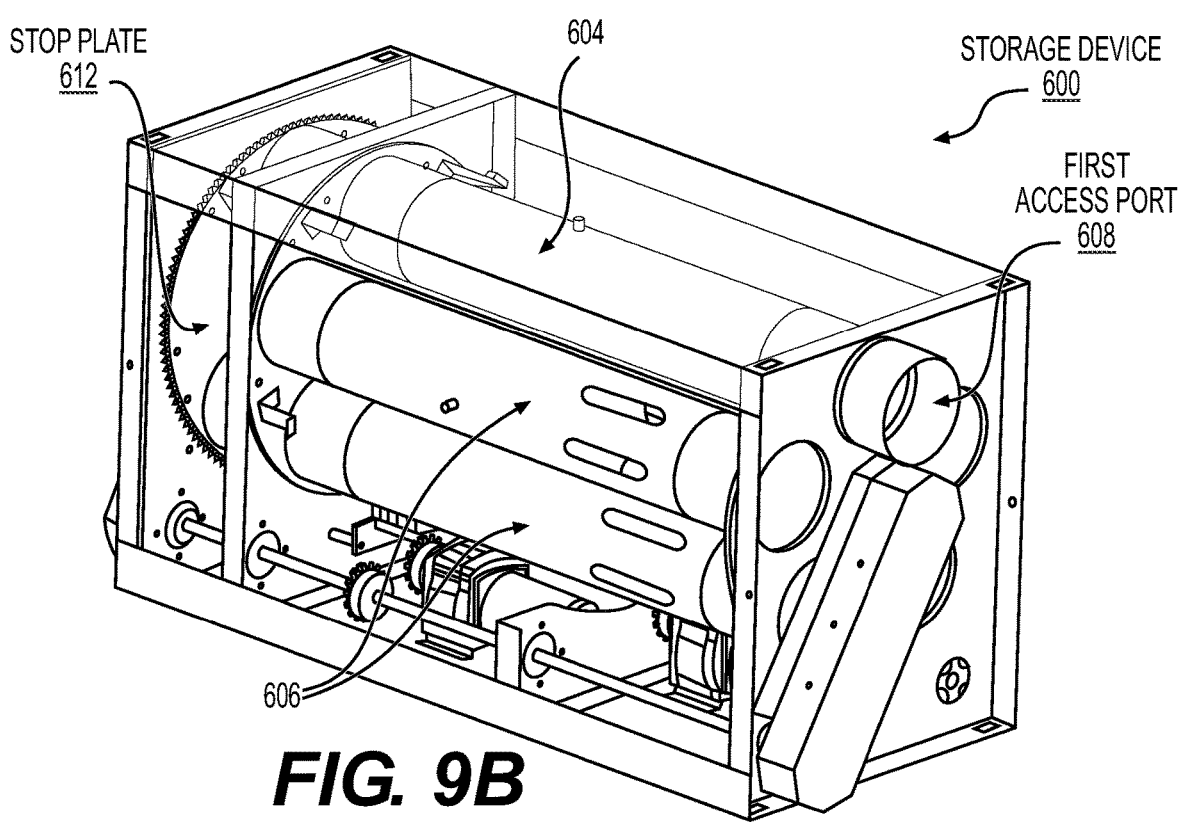

FIGS. 9a-c show views of an exemplary storage device for use as a carrier vault separate from a workstation in a pneumatic tube system.

FIGS. 9d-f show cross-sectional views of the storage device of FIGS. 9a-c.

DETAILED DESCRIPTION

The present disclosure may be further understood with reference to the following description and the appended drawings, wherein like elements are referred to with the same reference numerals. The present disclosure is directed to systems and methods for securely and efficiently delivering items via a pneumatic tube system. In some exemplary embodiments, a workstation for the pneumatic tube system includes a secure vault for storing carriers prior to delivery to authorized personnel. In other exemplary embodiments, the secure vault can be located upstream from the destination workstation and the pneumatic tube system can include shared or dedicated components, e.g., diverters and/or blowers, to place a carrier in the vault, extract the carrier from the vault, and/or deliver the carrier to the workstation.

Pneumatic tube systems are used to transport items throughout various facilities. For example, pneumatic tube systems are often used to transport drugs, lab specimens, blood products and other items throughout hospitals and other healthcare facilities. For example, for a typical midsize hospital with, e.g., 300 patient beds, more than 1,200 medical items may be delivered each day via a pneumatic tube system. All items delivered by a hospital pneumatic tube system should be safeguarded given their role in patient care. However, certain deliveries of "high value" items, such as items that are difficult to replace (e.g., tissue samples and blood products), expensive items (e.g., cancer drugs), or controlled substances (e.g., narcotics), either require or benefit from additional security, tracking and control.

Historically, high-value items are either delivered by hand (what clinicians refer to as "walked") or transported by pneumatic tube either without additional precautions or with added steps that increase security at the expense of speed, reliability, and ease of use. Walking an item adds considerable time to a delivery and may additionally take a highly paid and skilled clinician away from their core patient-centric tasks. Walking also adds to the workload of elevators, reducing their availability to patients, staff and visitors.

Transporting high-value items by pneumatic tube without additional precautions is often undesirable and may even violate Federal and State regulations. Even when regulations are not a factor, unprotected deliveries increase the chance that high-value items will be misplaced or retrieved by unauthorized recipients. For example, a misplaced tissue sample may put a patient's safety at risk and/or cause undue suffering when a second sample must be obtained. In another example, a misplaced cancer drug may delay treatment and incur significant expense. In still another example, a controlled substance that is misdelivered can increase the risk that the substance will be misused, perhaps in a dangerous manner. Safety can be improved when security steps are added, but these steps are often cumbersome and may decrease efficiency and increase the complexity of the delivery process. In a hospital, few things are as valuable as a clinician's time, and anything that adds to the workload of a clinician takes them away from patient-centric tasks, and by extension, adversely impacts patient care. Similarly, any equipment and/or procedures that are complex increase the chance for error and may degrade care.

The features in use today to improve the security of high-value items transported by pneumatic tube system generally suffer from various shortcomings. One common approach holds a high-value item and its carrier above a receiving station on said station's slide-plate until an authorized recipient identifies himself (e.g., by entering a release-code, scanning an ID badge, etc.). Although this approach is potentially secure (depending on the implementation details), until the carrier is retrieved (i.e., while the carrier is held on the slide plate), the receiving station is not available for deliveries or the sending out of departing carriers, which may result in cascading system-wide delays.

Approaches requiring a clinician to scan an ID badge to trigger release of the carrier may not limit release to only an intended recipient of the carrier (e.g., a scan of any ID badge may be permitted to release the carrier). If the high-value item in the carrier is, for example, a narcotic, the non-targeted recipient may be tempted to misuse the contents. If the item is a high-value drug or blood product, the item is at risk of being misplaced before the intended recipient takes possession. If, to enhance security, the release of the carrier is permitted only when an authorized recipient identifies himself as present at the station (i.e., only the scan of a single ID or one of a defined group triggers release of the carrier), the time that the receiving station is offline is further increased as other users that may arrive at the station before the authorized recipient(s) cannot retrieve the carrier. If no authorized person is available (e.g., is on break or with a patient), the wait may be lengthy.

In another existing approach, the station itself can hold carriers in secure locations while remaining open to a limited number of other carrier departures and arrivals. These stations are mechanically complex and costly, making them impractical for most new construction and retrofit applications. Those skilled in the art recognize that pneumatic tube workstations must be reliable with near 100% uptime and require minimal maintenance. Stations that require multiple motors, sensors and datasets to work in unison are often unreliable. Known multi-purpose stations generally hold no more than four carriers that are either waiting to depart or waiting to be retrieved. Once full, the stations go offline causing system-wide congestion. And once a carrier has been placed inside the station, the sending clinician has no way to know how long the carrier will wait before departure since these stations generally have only a single in/out tube port. The ideal solution, as described herein, stores multiple inbound high-value carriers and their cargo securely while keeping the station open for regular arrivals and departures.

According to various exemplary embodiments described herein, a secure carrier vault is implemented at a pneumatic tube workstation and is configured for holding one or more carriers prior to retrieval by authorized personnel. The exemplary secure vault is reliable, mechanically simple, easy to use and affordable, while requiring only traditional preventive maintenance.

The exemplary secure vault is configured as a self-contained electromechanical box that can be used in new workstations as well as in retrofit upgrades to existing workstations. The secure vault is further configured to keep the workstation online nearly 100% of the time by moving certain carriers (e.g., high value carriers) away from an access port for the workstation, allowing standard carriers to be sent and received at the workstation while the high value carriers remain securely stored. The secure vault according to an exemplary embodiment relies on gravity to drop the carrier, keeping blowers and other system resources available for system use. Alternative embodiments employ blowers to move the carriers from secure locations to the location from which they may be accessed by recipients. Additionally, the secure vault according to one embodiment positively identifies personnel authorized to receive the carrier so that the carrier may be released only when the presence of an authorized recipient is established.

In the following, the carriers received at the workstation may be referred to as "high-value" carriers or "standard" carriers. The high value carrier refers to a carrier that is subject to some form of additional security, tracking or control and that is required to be received by an authorized user, while the standard carrier is not subject to additional controls and may be passed to the access bin of the workstation without any additional authorization measures. The type of carrier, e.g., standard or high value, can be indicated by the sender of the carrier and subsequently tracked by the pneumatic tube system so that the carrier is processed in accordance with the type. The high value carriers can be additionally identified by the sender so that only certain individuals are authorized to receive the particular carrier, e.g., one specific person, a group of people (e.g., nurses), etc. Although the following embodiments are described with respect to the storing of high value carriers, it should be understood that any carrier can be stored in the secure vault for any reason, for example, when the arrival bin is full, as will be described in further detail below.

FIGS. 1a-b show an exemplary pneumatic tube workstation 100 for a pneumatic tube system including a secure vault 102 for securely holding multiple carriers 104 prior to retrieval by authorized personnel, according to various exemplary embodiments described herein. FIG. 1a shows a front view of the exemplary workstation 100 and FIG. 1b shows a side view of the exemplary workstation 100. The secure vault 102 incorporates a rotatable carousel 114 with multiple carrier ports 116 for holding one or more high value carriers 104h, to be described in further detail below with respect to FIG. 2a-g.

The workstation 100 includes an access port 106 extending from the top of the secure vault 102. The access port 106 is sized and shaped to connect to the pneumatic tubing 108 of the pneumatic tube system, e.g., the main arrival/departure system access tube 108. For example, the pneumatic tubing 108 and the access port 106 may have a diameter of 4" or 6". However, those skilled in the art will recognize that the components of the workstation 100 may be sized to support any size of tubing.

The workstation 100 further includes a carrier arrival bin 110 for receiving the carriers 104 that are dropped down from the pneumatic tube 108 (via the secure vault 102) prior to retrieval by personnel. The arrival bin 110 is sized to hold a number of carriers prior to retrieval. The workstation 100 also includes a slide gate (not shown) that can be retracted to allow the carriers to drop into the arrival bin 110. In the example of FIGS. 1a-b, the workstation 100 has two legs 112 attached to the sides of the arrival bin 110 for supporting the workstation 100 from the floor at a height that is convenient for use by personnel. However, those skilled in the art will recognize that the workstation 100 can be supported in alternative ways, for example by mounting the workstation 100 to a wall using suitable mechanical fastenings, or using four feet extending from the bottom of the arrival bin 110 to support the workstation when the workstation 100 is installed on, e.g., a countertop.

Figure 2A:
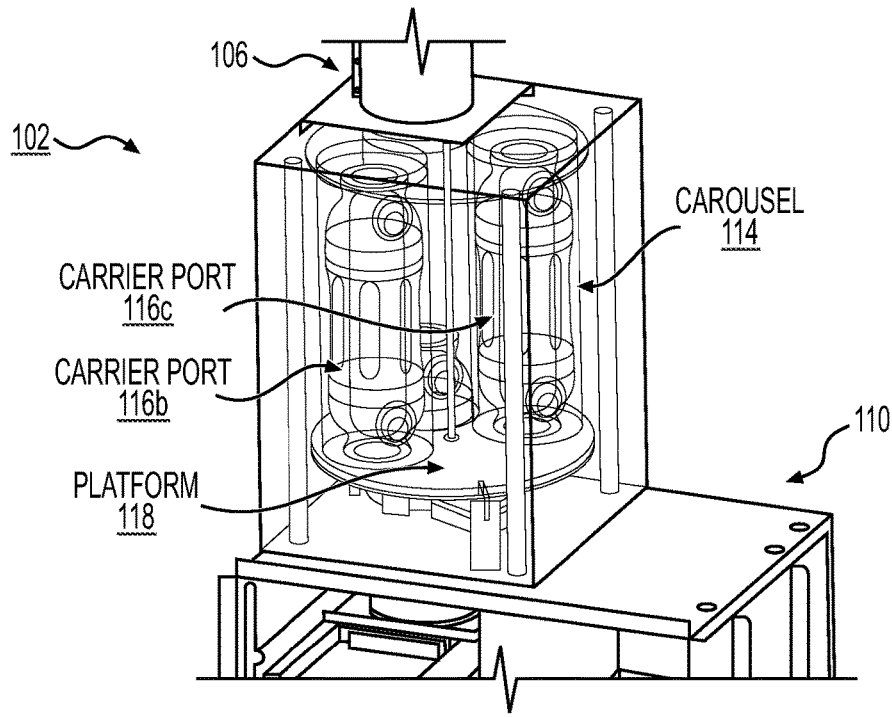
FIG. 2c shows a front view of the secure vault of FIGS. 1a-b.
FIG. 2d shows a side view of the secure vault of FIGS. 1a-b.
FIG. 2e shows a top view of the secure vault of FIGS. 1a-b in the default position.
FIG. 2f shows a top view of the secure vault of FIGS. 1a-b in a first catch position.
FIG. 2g shows a top view of the secure vault of FIGS. 1a-b in the default position with a first high-value carrier stored in the secure vault.
FIG. 2h shows a top view of the secure vault of FIGS. 1a-b in a second catch position.
FIG. 2i shows a top view of the secure vault of FIGS. 1a-b in the default position with the first high-value carrier and a second high-value carrier stored in the secure vault.
FIG. 2j shows a top view of the secure vault of FIGS. 1a-b in a release position for delivering the second high-value carrier to the arrival bin.
Figure 2B:
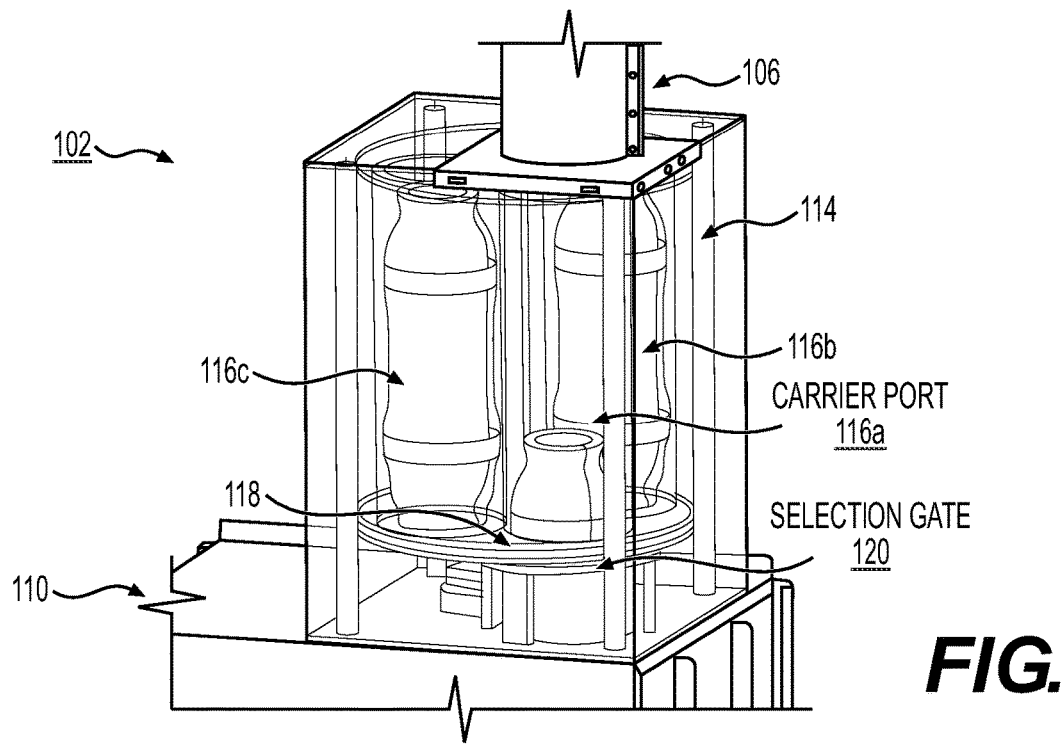
Figure 2C:
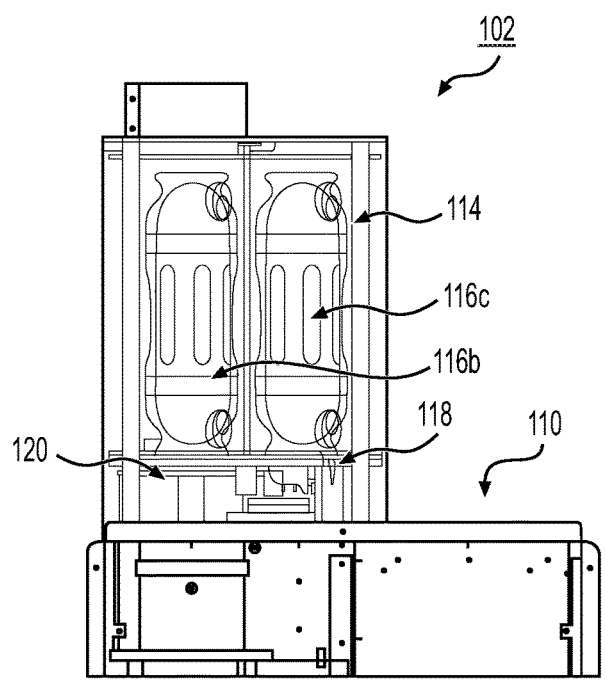
Figure 2D:
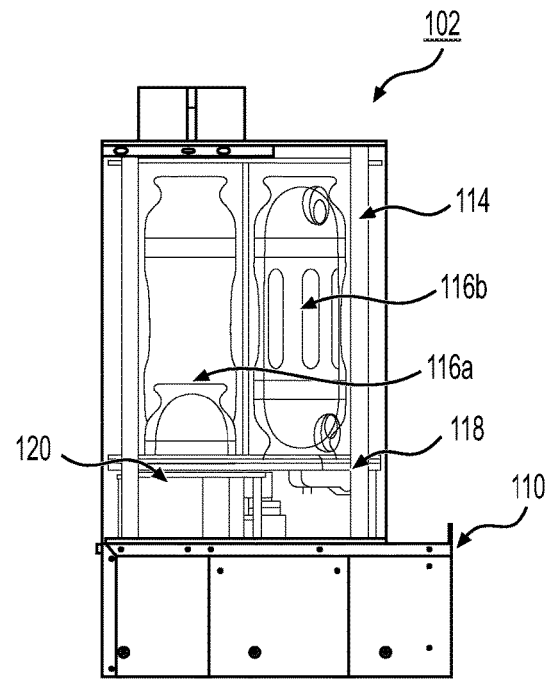
Figure 2E:
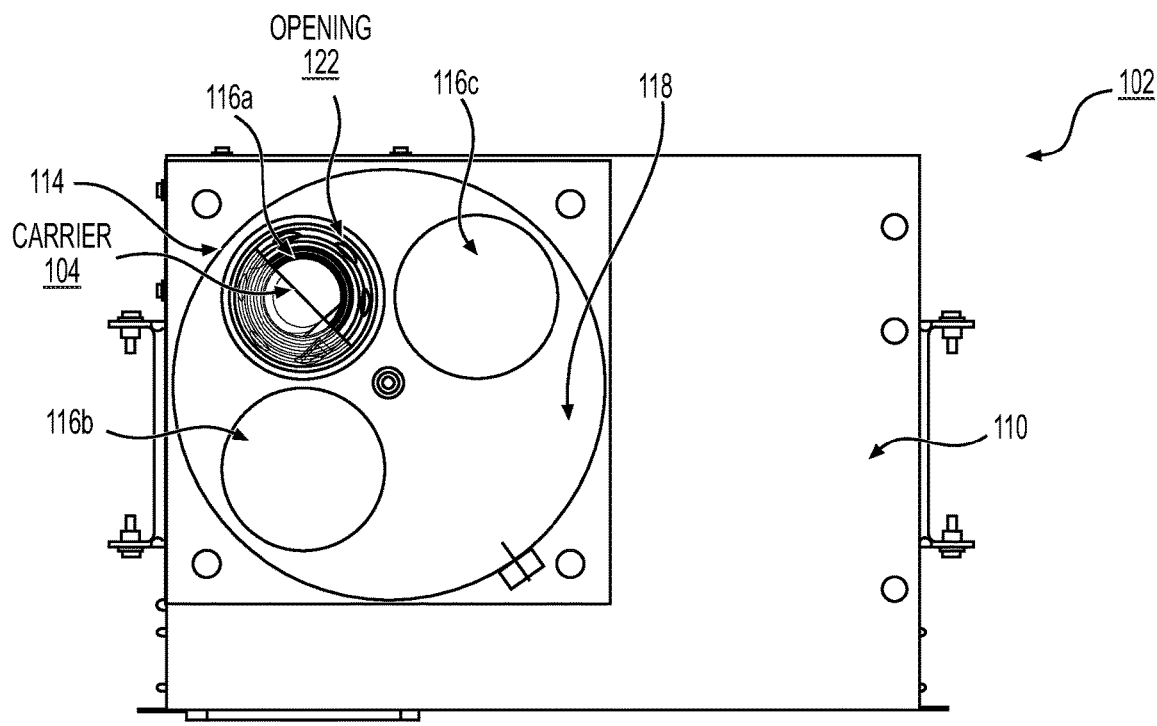
Figure 2F:
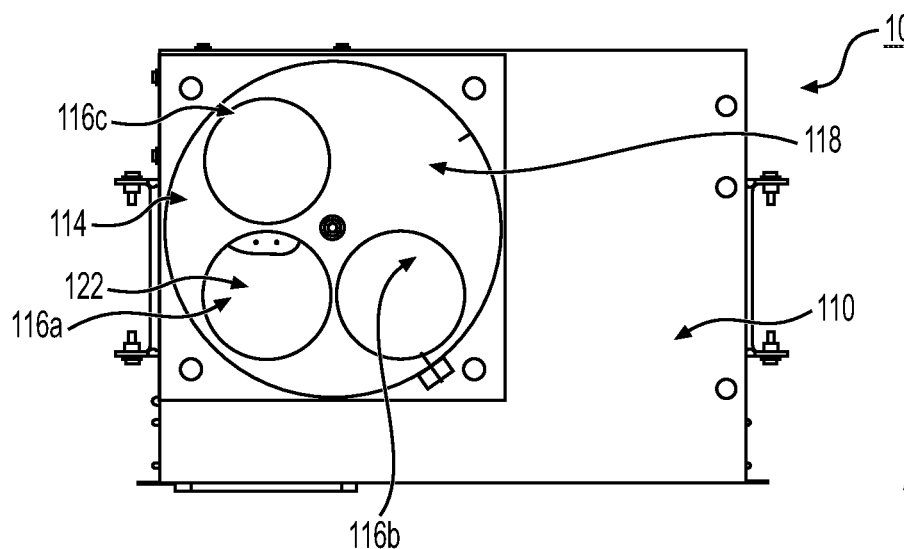
Figure 2G:
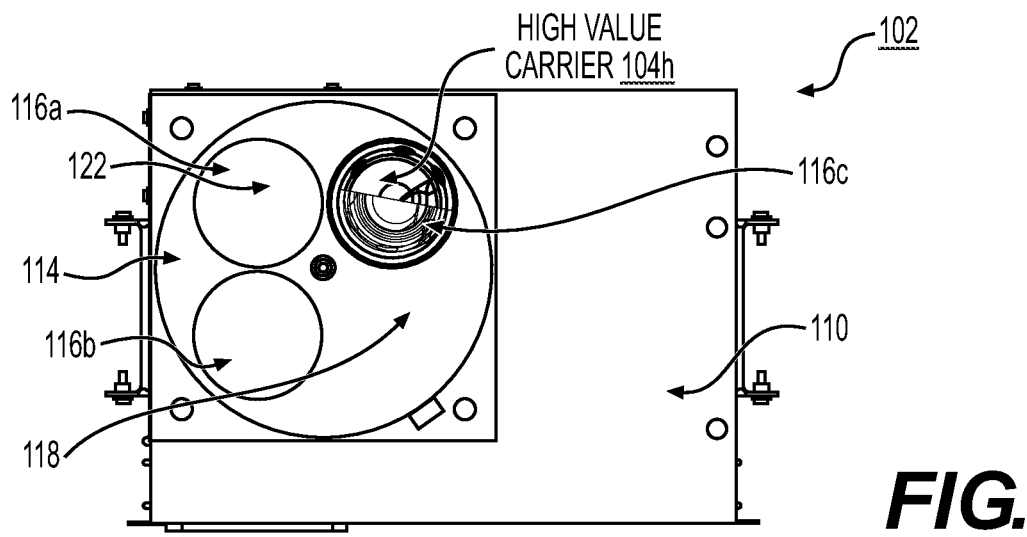
Figure 2H:
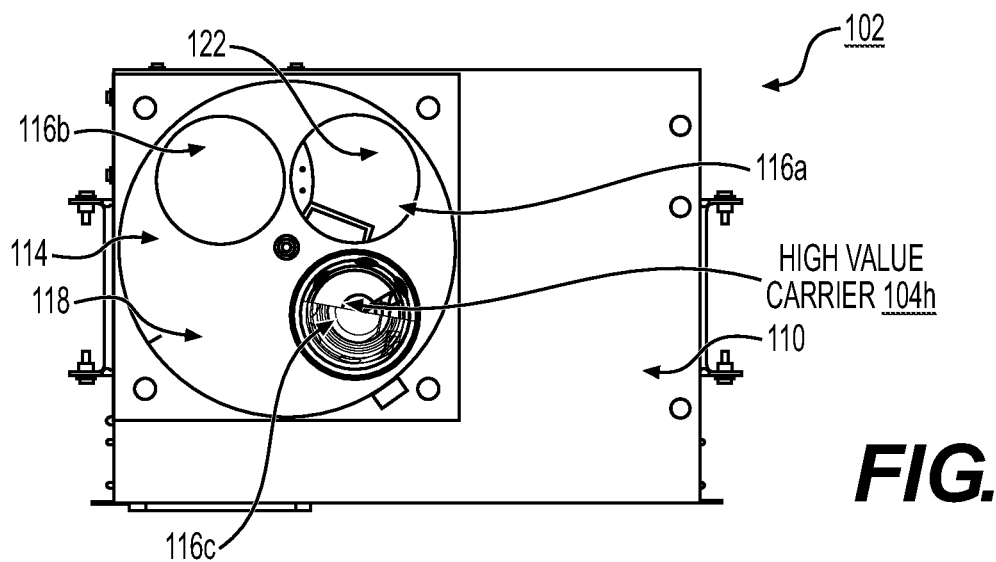
Figure 2I:
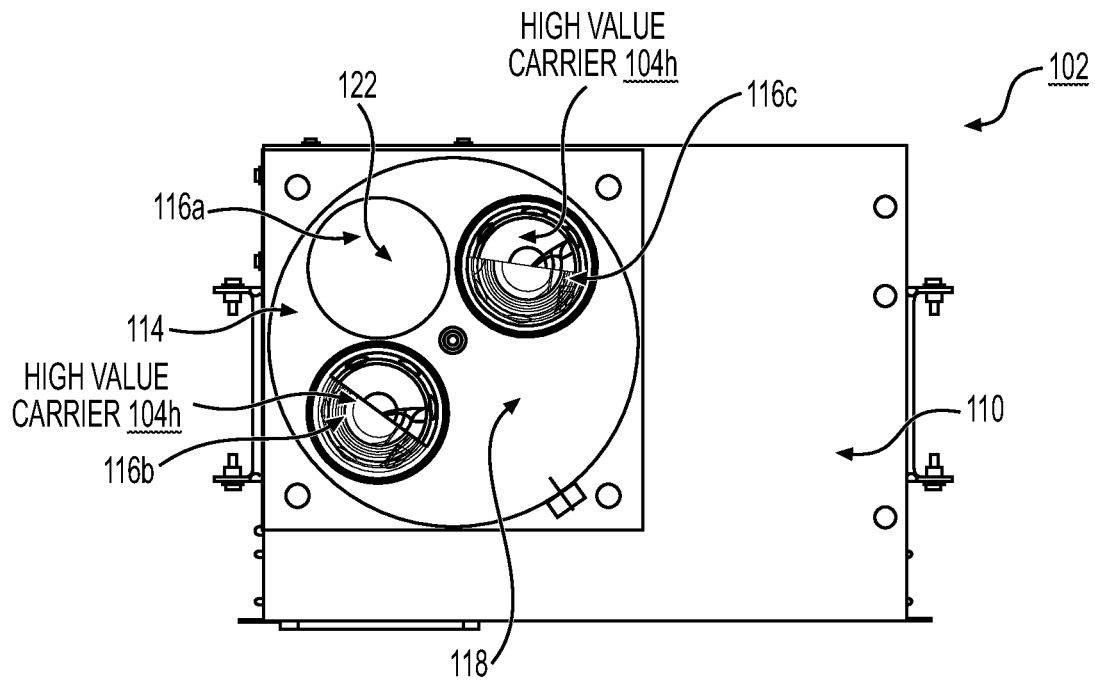
Figure 2J:
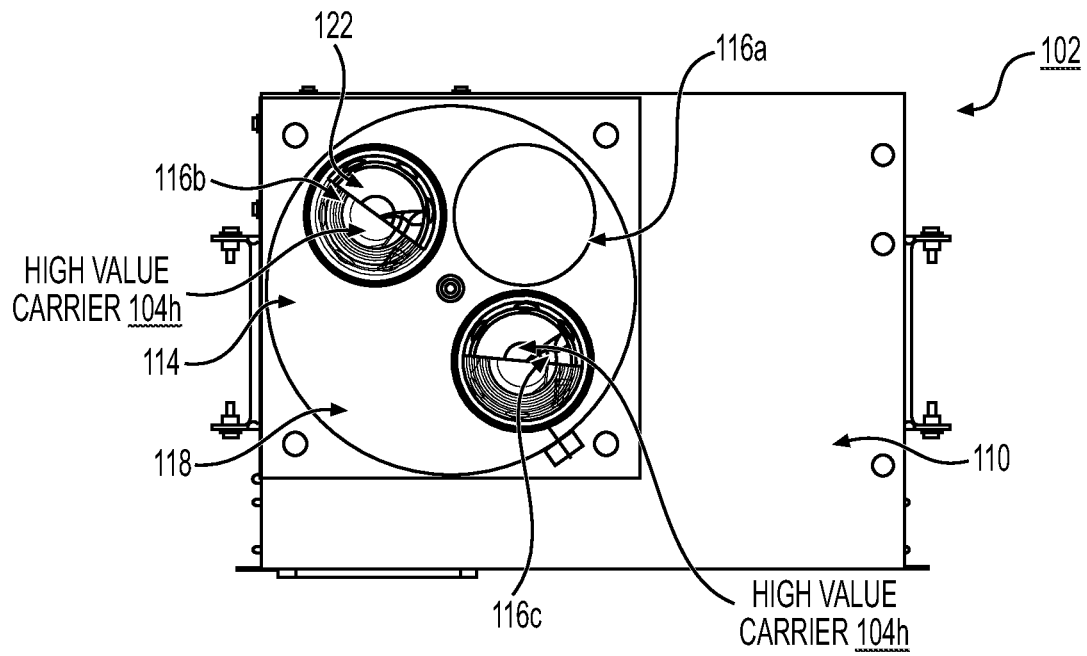

FIGS. 2a-g show the secure vault 102 of the workstation 100 of FIGS. 1a-b according to various exemplary embodiments described herein. FIGS. 2a-b show perspective views of the secure vault 102; FIG. 2c shows a front view of the secure vault 102; FIG. 2d shows a side view of the secure vault 102; FIG. 2e shows a top view of the secure vault 102 in the default position; FIG. 2f shows a top view of the secure vault 102 in a first catch position; FIG. 2g shows a top view of the secure vault 102 in the default position with a first high-value carrier 104h stored in the secure vault 102; FIG. 2h shows a top view of the secure vault 102 in a second catch position; FIG. 2i shows a top view of the secure vault 102 in the default position with the first high-value carrier 104h and a second high-value carrier 104h stored in the secure vault 102; FIG. 2j shows a top view of the secure vault 102 in a release position for delivering the second high-value carrier 104h to the arrival bin 110.

The secure vault 102 incorporates a carousel 114 with multiple carrier ports 116 (in this example, three (3) vertical carrier ports 116a, 116b and 116c although those skilled in the art will understand that any number of carrier ports may be included depending on considerations of space, etc.) coupled to a platform 118. A first one of the carrier ports 116, which in this example corresponds to carrier port 116a, is open for receiving deliveries of standard carriers 104 and for sending carriers 104 out from the workstation 100. Thus, the carrier port 116a is aligned with the access tube 108 (at the top of the carrier port 116a) and an opening into the arrival bin 110 (at the bottom of the carrier port 116a). The remaining carrier ports 116b and 116c are available to hold arriving high-value carriers 104h in the secure vault 102 until retrieved by an authorized recipient. Each carrier port 116 is formed as a tube segment having a diameter and length selected to be sufficient to hold a carrier 104 therein, in accordance with the specifications of the pneumatic tube system carrying the carriers 104.

The carousel 114 is rotatable between three positions: 1) a first position in which the carrier port 116a is aligned with the access port 106 and the main arrival/departure system access tube 108, as shown in FIG. 2e; 2) a second position in which carrier port 116b is aligned with the access port 106 and the main arrival/departure system access tube 108, as shown in FIG. 2f; and 3) a third position in which carrier port 116c is aligned with the access port 106 and the main arrival/departure system access tube 108, as shown in FIG. 2h. In a default position, the carousel 114 is rotated so that one of the carrier ports 116 (e.g., carrier port 116a) is aligned with the main arrival/departure system access tube 108 of the workstation 100. This default position allows the workstation 100 to operate in its most efficient manner (e.g., permitting standard carriers 104 to pass through the carrier port 116a for delivery to the station) since the vast majority of arrivals are standard carriers 104 and not high-value carriers 104h.

The platform 118 includes three openings aligned with the bottom openings of the carrier ports 116. A plate referred to as a selection gate 120 is rotatably mounted beneath the platform 118 and includes a single opening 122. The selection gate 120 of this embodiment has two modes of operation: a first mode where the selection gate 120 is fixed to the carousel 114 and rotatable therewith when the carousel 114 is rotated; and a second mode where the selection gate 120 is stationary and non-rotatable even when the carousel 114 is rotated. The selection gate 120 and the carousel 114 of this embodiment can be fastened together using a latch 124 mounted on the selection gate 120, to be described in greater detail below with respect to FIGS. 3a-c. When the selection gate 120 and the carousel 114 are attached, a rotation force applied to the carousel 114 by, e.g., a motor, to be described below in FIGS. 4a-b, will cause the selection gate 120 to rotate along with the carousel 114. When the selection gate 120 and the carousel 114 are detached, the selection gate 120 remains stationary while the carousel 114 rotates.

The selection gate 120 includes the opening 122 that allows the carriers 104 to pass between the carrier ports 116 and the arrival bin 110 when a given carrier port 116 is aligned with the opening 122. When the selection gate 120 is in the open position, the selection gate 120 is in axial alignment with the main arrival/departure system access tube 108 and with the carrier port 116 in the same current alignment, which in this example is carrier port 116a, as shown in FIG. 2e. When the selection gate 120 is in the closed position, the selection gate 120 is out of axial alignment with the main arrival/departure system access tube 108 and with the carrier port 116 in the same alignment as the access tube 108, such as, for example, the carrier port 116c in FIG. 2f and the carrier port 116b in FIG. 2h, thus, preventing a carrier 104 received in the carrier port 116 from entering the arrival bin 110. Thus, when a high value carrier 104h is arriving to the workstation 100, the selection gate 120 is rotated to the closed position to prevent the high value carrier 104h from dropping into the arrival bin 110. A default position for the selection gate 120 is the open position so that if, for example, the carrier port 116a is currently aligned with the main arrival/departure system access tube 108 and a standard carrier 104 arrives to the workstation 100, this arriving carrier 104 drops into the arrival bin 110 without being stored in the secure vault 102. Additionally, when the selection gate 120 is in the open position, personnel can use the main arrival/departure system access tube 108 to send out carriers as the carrier port 116a provides an open connection to the main arrival/departure system access tube 108.

FIGS. 2e-j show an exemplary series of operations for storing high value carriers 116h in the secure vault 102. In FIG. 2e, the carrier port 116a and the selection gate 120 are in the open position. A standard carrier 104 is shown passing through the carrier port 116a and the opening 122 in the selection gate 120. As described above, in the open position, the workstation 100 can be used in normal operation to receive any number of standard carriers 104 and send any number of the carriers 104, including standard carriers 104 and high value carriers 104e.

A system software executed by a processor (not shown) may be notified that a high value carrier 104h is imminently arriving at the workstation 100 while the carrier port 116a and the selection gate 120 are in the open position. To receive and securely store the high value carrier 104h, in a first step, the carousel 114 and the selection gate 120 are fastened and rotated in a first direction (in this example, counter-clockwise), bringing the carrier port 116a and the opening 122 of the selection gate 120 out of alignment with the arrival/departure access tube 108 and bringing the carrier port 116c into alignment with the arrival/departure access tube 108. This position may be considered a "catch" position for the carrier port 116c, wherein the selection gate 120 is in the closed position for the carrier port 116c while the carrier port 116c is positioned to receive a carrier 104 from the access tube 108, as shown in FIG. 2f.

The high value carrier 104h is then received in the carrier port 116c. Those skilled in the art will also understand that, when the selection gate 120 extends across the bottom of the carrier port 116 currently rotated into alignment with the main arrival/departure system access tube 108, the selection gate 120 of this embodiment may optionally form a substantially airtight seal with the bottom of the carrier port 116 so that air trapped in this carrier port 116 forms a cushion that slows down the high value carrier 104h as it enters the carrier port 116 so that the carrier 104h does not impact the selection gate 120 forcefully.

The carousel 114 and the selection gate 120 remain fastened, and, in a second step, are rotated in the reverse direction (in this example, clockwise) and back into the open position for the carrier port 116a, as shown in FIG. 2g. The high value carrier 104h is accordingly rotated into the secure vault 102 to await retrieval from authorized personnel. As before, the workstation 100 can be used in normal operation.

The system software may be notified that a second high value carrier 104h is imminently arriving at the workstation 100 while the carrier port 116a and the selection gate 120 are in the open position and while the carrier port 116c is holding the first high value carrier 104h. To receive and securely store the second high value carrier 104h, in a third step, the carousel 114 and the selection gate 120 remain fastened and are rotated in a second direction (in this example, clockwise), bringing the carrier port 116a and the opening 122 of the selection gate 120 out of alignment with the arrival/departure access tube 108 and bringing the carrier port 116b into alignment with the arrival/departure access tube 108. This position may be considered the "catch" position for the carrier port 116b, wherein the selection gate 120 is in the closed position for the carrier port 116b, as shown in FIG. 2h.

The high value carrier 104h is then received in the carrier port 116b. The carousel 114 and the selection gate 120 remain fastened, and, in a fourth step, are rotated in the reverse direction (in this example, counter-clockwise) and back into the open position for the carrier port 116a, as shown in FIG. 2i. The high value carrier 104h is rotated into the secure vault 102 to await retrieval from authorized personnel. In this current operation state the two carrier vaults 114b, 114c are both holding high value carriers 104h, thus, the exemplary secure vault 102 cannot receive any more high value carriers 104h. If two high value carriers 104h are already being held at a workstation 100 including three carrier ports 116, the software instructs the system to prevent the sending of any additional high value carriers 104h to this workstation 100 until one of the already received high value carriers 104h has been cleared from the secure vault 102. This permits the workstation 100 to continue to send out carriers 104 and to receive standard carriers 104. Thus, as before, the workstation 100 can be used in normal operation. Based on usage statistics gathered from hundreds of hospitals, two (2) storage ports are sufficient to accommodate high-value item deliveries 99.99% of the time.

The system software for the pneumatic tubing system and/or the workstation 100 can be adapted to notify the intended recipient(s) of the delivery of a high value carrier 104h to the workstation 100 and, once notified, the recipient will be required to provide secure identification at the workstation 100 to authorize the secure vault 102 to dispense the correct high value carrier 104h to the authorized recipient. Once authorized, and with no scheduled incoming carriers to the workstation 100, the system software will temporarily prevent any new carriers 104, including either standard carriers 104 or high value carriers 104h, from being sent to the workstation 100. The system software will then proceed to dispense the correct high value carrier 104h to the workstation 100 for delivery to the authorized recipient. The system software alerts the recipients of the arrival of a high-value carrier 104*h* through various methods depending on a hospital's workflow processes. Alert methods may include posting a visual message on a touch control display of the workstation 100, generating an audio alert, triggering a remote alert light, sending a message to a nurse-call system, communicating with a EMR (electronic medical record) system, or sending an email or text message.

The system software sets parameters for the credentials needed to release the high value carrier 104*h* into the arrival bin 110 of the workstation 100. These parameters can establish delivery authorization rules that are broad, narrow or somewhere in-between. For example, a first rule for a given high value carrier 104*h* may allow any user with an employee badge to release the high value carrier 104*h*, a second rule for a given high value carrier 104*h* may allow a subset of users, such as operating room nurses, to release the high value carrier 104*h*, or a third rule for a given high value carrier 104*h* may allow only one specific person to release the high value carrier 104*h*. Alternatively, these different levels of security precautions may be changed based on different sub-categorizations of high value carriers. When the system has determined that release of the high value carrier 104*h* is authorized, the carousel 114 rotates until the carrier port 116 containing the desired high value carrier 104*h* is aligned with the main arrival/departure system access tube 108. The selection gate 120 is concurrently or subsequently moved to the open position, and the carrier 104*h* drops into the arrival bin 110.

To dispense the stored high value carrier 104*h* from its respective port 116, the carousel 114 and the selection gate 120 are detached to allow rotation of the carousel 114 while the selection gate 120 remains stationary. The carousel 114 is then rotated and the selection gate 120 remains fixed in the open position until the proper port 116 is in axial alignment with the main arrival/departure system access tube 108, as shown for the carrier port 116*b* in FIG. 2*j*. The stored high value carrier 104*h* is then dispensed to the arrival bin 110 through the opening in the selection gate 120 under its own weight/mass for a gravity-induced drop into the arrival bin 110 for retrieval by the authorized recipient.

After successful delivery of the high value carrier 104*h*, the carousel 114 is rotated in the reverse direction, while the selection gate 120 remains fixed, until port 116*a* is once again in axial alignment with the main arrival/departure system access tube 108, putting the carousel 114 and selection gate 120 into the default position whereby the workstation 100 remains open to send and receive other carriers 104. The system software will then remove the block on incoming carriers 104 and will again allow carriers 104 to be received at the workstation 100. The overall system can then continue unimpeded. A similar process may be used to dispense the high value carrier 104*h* from the carrier port 116*b*. This process is repeated as high-value carriers 104*h* are stored in and retrieved from the secure vault 102.

Those skilled in the art will understand that different operations, similar to those described above, can be used for storing carriers 104 in and retrieving carriers 104*h* from the secure vault 102 depending on the specifications of the secure vault 102. For example, in other embodiments, a greater or lesser number of carrier ports 116 can be used. Only space saving considerations prevent the addition of more carrier ports 116 to the carousel 114. Thus, where space considerations permit, any number of carrier ports 116 may be added to the carousel 114 allowing the workstation 100 to hold an increased number of high-value carriers 104*h* in the secure location while the workstation 100 remains open for normal receiving and send operations. However, in these embodiments, a more complex mechanism may be used for the storing and retrieval of the carriers 104*h* from the ports 116. For example, the selection gate 120 may be configured to rotate independently from the carousel 114. In another example, multiple selection gates 120 may be used in series.

As described above, the selection gate 120 and the carousel 114 comprise means for attaching so that the rotation of the carousel 114 is also imposed on the selection gate 120 and detaching so that the selection gate 120 remains fixed while the carousel 114 is rotated.

FIGS. 3*a-c* shows the exemplary carousel 114 of the previous Figures including the latch 124 for attaching the selection gate 120 to the platform 118 of the carousel 114. The latch 124 is mounted upon and moves with the selection gate 120 during operation. In this example, the latch 124 comprises a solenoid that is normally extended and retracts upon delivery of voltage. When the solenoid is in a normal, non-energized position, the latch 124 engages the structure enclosing the carousel 114 so that the selection gate 120 cannot rotate, as shown in FIG. 3*b*. This position may be considered a home position of the carousel 114 wherein the solenoid is de-energized and, should the solenoid fail, the workstation 100 will remain operational as a fail-safe operation. When the solenoid is in an energized position, the latch 124 disengages from the structure and engages the platform 118 of the carousel 114 so that the selection gate 120 will rotate when the carousel 114 is rotated.

Those skilled in the art will understand that the example provided in FIGS. 3*a-c* is only exemplary, and different mechanisms may be used to attach the selection gate 120 to the carousel 114 and detach the selection gate 120 from the carousel 114.

The carousel 114 can be rotated using various mechanisms. In one embodiment, the carousel 114 is driven by a 12 VDC gearmotor driving a Geneva mechanism 126, as shown in FIGS. 4*a-b*. The Geneva will provide exactly one revolution and then lock the axle position during the remainder of the motors one revolution. To move the carousel, the motor is energized for one revolution in the desired direction, and then reversed one revolution to bring the carousel back. If the gearmotor output is at 12 RPM, then one revolution from the gearmotor, motivating the carousel from one position to another, should be a 5 second cycle maximum.

An additional benefit of the secure vault 102 design is that, should a high-value carrier 104*h* not be released in a predetermined amount of time, the system software can create a transaction to remove the high value carrier 104*h* from the secure vault 102 and return it to its origin or to another location. To accomplish this task, the system will call for the secure vault 102 to dispense the high value carrier 104*h* in question from the workstation 100. The carousel 114 is rotated to position the port 116 including the carrier 104*h* into a position aligned with the main arrival/departure system access tube 108. At this point, a source of air beneath the carrier 104*h* is provided (e.g., through a separate valve or by partially opening the selection gate 120) while maintaining the carrier 104 in the secure location. The carrier 104*h* is then vacuumed out of the workstation 100 in the same manner as any other carrier 104.

The secure vault 102 described above is located at the workstation 100 of the pneumatic tube system. Thus, the carriers 104, including high value carriers 104*h*, are routed through the pneumatic tube system using components, e.g., blowers, diverters, etc., shared with other workstations. That is, this system does not include any components separate from the workstation 100 in the pneumatic tubing system (e.g., upstream from the workstation 100) dedicated to the delivery of high value carriers 104h.

FIG. 5 shows a pneumatic tube system 200 for the workstation 100 comprising the secure vault 102 of the previous Figures. The system 200 includes a system blower 204 servicing any number of workstations, including the workstation 100 and a number of further workstations 202, via one or more diverters 206. In this example, the diverter 206 is a four-port diverter. However, those skilled in the art understand that additional diverters or other components may be used downstream from a system blower.

In the example of FIG. 5, the system blower 204 places a carrier into the dedicated secure vault 102 of the workstation 100, with final delivery of the carrier being achieved via gravity. In other embodiments, the carrier can be delivered under pressure from a blower. As described above, the dedicated secure vault 102 can store inbound high value carriers 104h and may additionally store standard carriers 104 if necessary, for example, when the access bin 110 is full.

In alternative embodiments, a secure carrier vault can be located separately from the workstation within the pneumatic tube system (e.g., upstream from the workstation). In these embodiments, the workstation may be a typical, existing workstation and the separate carrier vault may be dedicated to processing carriers to/from this one particular workstation. In other embodiments, the separate carrier vault can be dedicated to processing carriers for multiple workstations. This secure carrier vault located upstream from the workstation may be used as an additional secure storage location when a workstation is already holding a maximum number of carriers, for example in its arrival bin and/or attached carrier vault. In some embodiments, the separate carrier vault can be a modified diverter, for example comprising one port as a pass-through tube and additional ports as storage stubs. In other embodiments, the separate carrier vault can comprise functionality similar to the carrier vault attached to the workstation described above, e.g., comprising a rotatable carousel of carrier ports and a selection gate for preventing or allowing the carriers to pass through the vault to the workstation, to be described in further detail below with respect to FIGS. 9a-f.

FIG. 6 shows a pneumatic tube system 300 comprising a diverter 308 with storage stubs 310 for use as a secure carrier vault. The system 300 includes a system blower 304 servicing any number of workstations 302, via one or more standard diverters 306. In this example, both the carrier vault diverter 308 and the standard diverter 306 are four-port diverters. Thus, the carrier vault diverter 308 has a port servicing the workstation 302a and three ports available as storage stubs 310 for holding high value carriers 104h. Those skilled in the art understand that additional diverters or other types of diverters, e.g., diverters having a greater or lesser number of ports can be used.

In the example of FIG. 6, the system blower 304 places a carrier into the storage stubs 310 of the carrier vault diverter 308, extracts the carrier from the carrier vault diverter 308, and delivers the carrier to the workstation 302a. Similar to above, the carrier vault diverter 308 can store inbound high value carriers 104h and may additionally store standard carriers 104, if necessary, for example, when the access bin 110 of the workstation 302a is full.

In still another embodiment, the secure carrier vault can be located at a diverter upstream from the workstation, similar to the example of FIG. 6, and additionally the system can comprise a dedicated compact blower for processing carriers 104 for the carrier vault.

FIG. 7 shows a pneumatic tube system 400 comprising a dedicated compact blower 412 and a carrier vault diverter 408 with storage stubs 410 for use as secure carrier ports. The system 400 includes a system blower 404 servicing any number of workstations 402, via one or more standard diverters 406. In this example, both the carrier vault diverter 408 and the standard diverter 406 are four-port diverters. Thus, the carrier vault diverter 408 has a port servicing the workstation 402a, e.g., as a pass-through tube, and three ports available as storage stubs 410 for holding high value carriers. Additionally, the system 400 comprises a dedicated compact blower 412 upstream from a further diverter 414 and the carrier vault diverter 408. The further diverter 414 may have one port connected to the dedicated compact blower 412 and another port serving as a pass-through tube.

In the example of FIG. 7, the system blower 404 transmits a carrier downstream past the further diverter 414. At this stage, the system blower 404 places the carrier into a stub 410 (port) of the carrier vault diverter 408. The compact blower is used to extract the carrier after placement into the carrier vault diverter 408 under vacuum and deliver it to the destination workstation 402a under pressure. Thus, the system blower 404 does not need to be used for extraction and delivery of carriers and can be used instead to handle other deliveries. Similar to above, the carrier vault diverter 408 can store inbound high value carriers 104 and may additionally store standard carriers 104 if necessary, for example, when the access bin 110 of the workstation 402a is full. Additionally, the carrier vault diverter 408 can store outbound carriers 104 when downstream resources are busy.

In still another embodiment, a secure carrier vault can be located at a horizontal storage device upstream from the workstation, and the system can comprise a dedicated compact blower for processing carriers 104 for the carrier vault.

FIG. 8 shows a pneumatic tube system 500 comprising a horizontal storage device 508 for use as a secure carrier vault. In this example, the storage device 508 includes four tubes 510, three of which are used as storage tubes and one of which is used as a pass-through tube, in coordination with a carrier stop plate 512 comprising a single hole that can rotate independently from the tubes 510. The system 500 includes a system blower 504 servicing any number of workstations 502, via one or more standard diverters 506. Additionally, the system 400 comprises a dedicated compact blower 514 downstream from the storage device 508 and upstream from the workstation 502a.

In the example of FIG. 8, the system blower 504 transmits a carrier downstream to the storage device 508. When the carrier is stored in the storage device 508, the compact blower 514 can extract the carrier from the storage device 508 and deliver the carrier to the workstation 502a. Thus, the system blower 504 can be used to handle other deliveries. Similar to above, the storage device 508 can store inbound high value carriers 104h and may additionally store standard carriers 104 if necessary, for example, when the access bin 110 of the workstation 502a is full.

The storage device 508 can comprise functionality similar to the carrier vault attached to the workstation described above. The tubes 510 serving as carrier ports can be included in a rotatable carousel and the stop plate 512 serves as a selection gate for preventing or allowing the carriers to pass through the device 508 to the workstation 502a. In this example, the carousel and the stop plate can rotate independently from one another.

FIGS. 9a-c show views of an exemplary storage device 600 for use as a carrier vault separate from a workstation in a pneumatic tube system (e.g., located in a ceiling or other space separated from the workstation in the same or a different room). In this example, the storage device 600 comprises a rotatable carousel 602 supporting five tubes, wherein a first tube 604 is used as a pass-through tube and the remaining four tubes are used as carrier ports 606 for storing carriers. The storage device 600 further comprises a first access port 608 for receiving carriers transmitted downstream to the workstation (and for transporting carriers transmitted upstream from the workstation) and a second access port 610 for transporting carriers downstream to the workstation (and for receiving carriers transmitted upstream from the workstation).

The carousel 602 is rotatable within the storage device 600 so that any one of the five tubes can be brought into alignment with the access ports 608, 610. The carousel 602 can be rotated using a first motor. Between the carousel 602 and the second access port 610 is a stop plate 612, which is rotatable independently from the carousel 602, for example using a second motor. In this example, the stop plate 612 includes three tube stubs, as shown in the cross-sectional view of FIG. 9d. A first tube stub 614 is open on both ends and is used as a pass-through tube, while the remaining two tube stubs 616 are closed on the ends adjacent to the second access port 610.

When a carrier is to pass through the storage device 600, the tube stub 614 is brought into alignment with second access port 610. When a carrier is to be captured and stored within the storage device 600, either of the tube stubs 616 can be brought into alignment with the second access port 610. Those skilled in the art understand that only a single tube stub 616 can be used in the design of the storage device 600, rather than two tube stubs 616. The closed end of the tube stub 616 can provide an air cushion to slow incoming carriers arriving into a carrier port 606 of the carousel 602 as would be understood by those skilled in the art.

In default operation, the pass-through tube 604 of the carousel 602 is aligned with the first and second access ports 608, 610 so that carriers directed toward or leaving the workstation can freely pass through the storage device 600, as shown in the cross-sectional views of FIGS. 9e-f. When an incoming carrier is to be stored in the device 600, prior to arrival of the carrier at the device 600 the carousel 602 is rotated so that one of the carrier ports 606 is aligned with the first access port 608 and the stop plate 612 is rotated so that the tube stub 616 blocks access to the second access port 610. The carrier is received in the carrier port 606 and is slowed by an air cushion provided by the tube stub 616 so that the carrier stops within the carrier port 606. The carousel 602 and the stop plate 612 may then be rotated back into their respective pass-through positions, securing the carrier in the storage device 600. A similar method can be used to store additional carriers in the remaining carrier ports 606.

To remove a stored carrier from a given carrier port 606, the carousel 602 is rotated to return the carrier port 606 into alignment with the second access port 610 with the stop plate 612 in its pass-through position. A dedicated compact blower, e.g., the compact blower 412 of FIG. 7 or the compact blower 514 of FIG. 8, can be used to force the carrier out of the carrier port 606 and through the second access tube 610 under vacuum/pressure for delivery to the workstation. Alternatively, any system blower may be used to push the carrier to the workstation. As would be understood by those skilled in the art, the provision of a dedicated compact blower, may enhance system performance as, during the operation to pass a carrier from the device 600 to the workstation, the system blower will remain available to route carriers throughout the system as desired.

As discussed above, the carrier ports 606 comprise tubes sized and shaped similarly to the those used in the pneumatic tubing system. In the example of FIG. 9, the carrier ports 606 are slotted to relieve the air pressure of incoming carriers as the momentum is slowed by the stop plate 612. Additionally, the carrier ports 606 may comprise optical sensors for detecting arriving carriers. Furthermore, as would be understood by those skilled in the art, the slots in the carrier ports 606 are located so that, when a carrier is received therein, a seal of the carrier is between the workstation and the slots so that suction applied by the dedicated compact blower is not diminished by leakage from the slots. Alternatively, the slots may be selectively closable via any known valves so that they may be located anywhere along the carrier ports 606 without diminishing the efficacy of suction pressure applied by the dedicated compact blower. Such valves would also allow slotted carrier ports 606 to be used efficiently with a pushing pressure applied by a system blower (i.e., the valves would prevent leakage of pushing pressure from the slots).

The storage device described in FIG. 9 is preferably used in a pneumatic tubing system arrangement comprising a dedicated compact blower for extracting carriers from the device and delivering the carriers to the workstation. A system blower may not be able to accelerate the stationary carrier from a distance, thus the compact blower provides a local vacuum or pressure for accelerating the carrier from the device and delivering the carrier to the According to one example, a storage device of a pneumatic tube system comprises a rotatable carousel comprising at least a first tube and a second tube, each tube sized and shaped to permit passage of a carrier used to transport materials via the pneumatic tube system, the carousel being configured to rotate between a first position, where the first tube is aligned with an access tube of the pneumatic tube system, and a second position, where the second tube is aligned with the access tube.

The storage device further comprises a stop plate adjacent to the carousel comprising an open tube stub and at least one closed tube stub, the stop plate being configured to rotate between an open position, where the open tube stub is aligned with the access tube and the carrier is allowed to pass through the stop plate, and a closed position, where the closed tube stub is aligned with the access tube and the carrier is prevented from passing through the stop plate. When an arriving carrier is to be stored in the storage device, the carousel is rotated to or maintained in the second position and the stop plate is rotated into or maintained in the closed position to receive the arriving carrier in the second tube. When the arriving carrier is received in the second tube, the carousel is rotated to the first position and the stop plate is rotated into the open position so that the arriving carrier is stored in the storage device and the workstation remains available for subsequent carrier transmissions through the first tube.

According to another example, the closed tube stub provides an air cushion to slow arriving carriers. According to still another example, the second tube comprises at least one slot to relieve air pressure caused by the arriving carrier. According to still another example, when the stored carrier is to be delivered to a workstation, the carousel is rotated to the second position and the stop plate is rotated into or maintained in the open position to allow the stored carrier to be extracted from the storage device. According to still another example, a dedicated blower is used to provide a vacuum or a pressure to force the stored carrier through the stop plate and deliver the carrier to the workstation.

Although this application describes various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A carrier vault for a workstation of a pneumatic tube system, comprising:
    a rotatable carousel comprising at least a first and second carrier port, each carrier port sized and shaped to hold a carrier used to transport materials via the pneumatic tube system and to allow the carrier to pass through the carousel, the carousel being configured to rotate between a first position, where the first carrier port is aligned with an access tube of the pneumatic tube system, and a second position, where the second carrier port is aligned with the access tube; and
    a selection gate adjacent to the carousel comprising a rotatable plate and a selection gate opening, the selection gate being configured to rotate between an open position, where the selection gate opening is aligned with the access tube and the carrier is allowed to pass through the plate, and a closed position, where the selection gate opening is not aligned with the access tube and the carrier is prevented from passing through the plate,
    wherein, when an arriving carrier is to be stored in the carrier vault, the carousel is rotated to or maintained in the first position and the selection gate is rotated into or maintained in the closed position to receive the arriving carrier in the first carrier port, and
    wherein, when the arriving carrier is received in the first carrier port, the carousel is rotated to the second position and the selection gate is rotated into the open position so that the arriving carrier is stored in the carrier vault and the workstation remains available for subsequent carrier transmissions through the second carrier port.

2. The carrier vault of claim 1, wherein the carousel is rotatable independently from the selection gate.

3. The carrier vault of claim 1, further comprising:
    a latch attaching the selection gate to the carousel so that a rotation force applied to the carousel is imposed on the selection gate.

4. The carrier vault of claim 3, wherein the latch is mounted on the selection gate and is actuatable between an attached position, where the latch is attached to the carousel, and a detached position, where the latch is removed from the carousel.

5. The carrier vault of claim 4, wherein, in the detached position, the latch is attached to a support structure so that the selection gate is prevented from rotating and wherein the latch comprises a solenoid that forces the latch into the attached position when the solenoid is energized.

6. The carrier vault of claim 1, further comprising:
    processor configured to generate a predetermined signal to rotate the selection gate into the closed position when an indication is received by the processor that the arriving carrier is subject to additional security or control.

7. The carrier vault of claim 6, wherein the arriving carrier is kept in the carrier vault until an authorization is received by the processor to release the arriving carrier and wherein, when the authorization is received by the processor, the carousel is rotated to the first position and the selection gate is rotated to the open position so that the arriving carrier can pass through the selection gate into an arrival bin of the workstation.

8. The carrier vault of claim 1, wherein a default position for the carrier vault comprises the carousel in the first position or the second position and the selection gate in the open position.

9. The carrier vault of claim 1, wherein the carousel includes a third carrier port and the carousel is further configured to rotate to a third position where the third carrier port is aligned with the access tube.

10. The carrier vault of claim 1, wherein, when the arriving carrier is not released from the carrier vault within a predetermined amount of time, the carousel is rotated into the first position and a source of air is provided to return the arriving carrier into the pneumatic tube system.

11. The carrier vault of claim 1, wherein the second carrier port is a pass-through tube and the first carrier port is a storage tube and wherein the second carrier port comprises at least one slot to relieve air pressure caused by the arriving carrier.

12. The carrier vault of claim 1, wherein a dedicated blower is used to extract carriers stored in the carrier vault.

13. A storage device of a pneumatic tube system, comprising:
    a rotatable carousel comprising at least a first tube and a second tube, each tube sized and shaped to permit passage of a carrier used to transport materials via the pneumatic tube system, the carousel being configured to rotate between a first position, where the first tube is aligned with an access tube of the pneumatic tube system, and a second position, where the second tube is aligned with the access tube; and
    a stop plate adjacent to the carousel comprising an open tube stub and at least one closed tube stub, the stop plate being configured to rotate between an open position, where the open tube stub is aligned with the access tube and the carrier is allowed to pass through the stop plate, and a closed position, where the closed tube stub is aligned with the access tube and the carrier is prevented from passing through the stop plate,
    wherein, when an arriving carrier is to be stored in the storage device, the carousel is rotated to or maintained in the second position and the stop plate is rotated into or maintained in the closed position to receive the arriving carrier in the second tube, and
    wherein, when the arriving carrier is received in the second tube, the carousel is rotated to the first position and the stop plate is rotated into the open position so that the arriving carrier is stored in the storage device and a workstation associated with the storage device remains available for subsequent carrier transmissions through the first tube.

* * * * *